(12) United States Patent
Rakshit

(10) Patent No.: US 8,538,978 B2
(45) Date of Patent: Sep. 17, 2013

(54) PRESENTING A SEARCH SUGGESTION WITH A SOCIAL COMMENTS ICON

(75) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/951,271

(22) Filed: Nov. 22, 2010

(65) Prior Publication Data

US 2012/0131032 A1  May 24, 2012

(51) Int. Cl.
    *G06F 7/00* (2006.01)
(52) U.S. Cl.
    USPC ........................................ 707/767
(58) Field of Classification Search
    USPC ........................................ 707/767
    See application file for complete search history.

(56) References Cited

U.S. PATENT DOCUMENTS

| | | | | |
|---|---|---|---|---|
| 6,484,162 | B1* | 11/2002 | Edlund et al. | 1/1 |
| 7,647,312 | B2 | 1/2010 | Dai | |
| 7,672,932 | B2 | 3/2010 | Hood et al. | |
| 7,725,526 | B1* | 5/2010 | Kraft | 709/203 |
| 2007/0203906 | A1* | 8/2007 | Cone et al. | 707/6 |
| 2008/0109401 | A1 | 5/2008 | Sareen et al. | |
| 2008/0120331 | A1* | 5/2008 | Dettinger et al. | 707/102 |
| 2008/0306934 | A1 | 12/2008 | Craswell et al. | |
| 2009/0119289 | A1 | 5/2009 | Gibbs et al. | |
| 2009/0164929 | A1* | 6/2009 | Chen et al. | 715/769 |
| 2009/0271374 | A1* | 10/2009 | Korn et al. | 707/3 |
| 2009/0307205 | A1* | 12/2009 | Churchill et al. | 707/5 |
| 2010/0010977 | A1 | 1/2010 | Choi et al. | |
| 2010/0057698 | A1 | 3/2010 | Prasad Kantamneni et al. | |
| 2010/0082604 | A1* | 4/2010 | Gutt et al. | 707/721 |
| 2012/0078870 | A1* | 3/2012 | Bazaz | 707/706 |
| 2013/0097137 | A1* | 4/2013 | Kritt et al. | 707/706 |

OTHER PUBLICATIONS

Huanhuan Cao et al., "Context-Aware Query Suggestion by Mining Click-Through and Session Data", International Conference on Knowledge Discovery and Data Mining, Proceeding of the 14th ACM SIGKDD international conference on Knowledge discovery and data mining, Las Vegas, Nevada, USA, Aug. 2008 (pp. 875-883).
Bill Slawski, "Predictive Search Query Suggestions", SEO by the Sea, Internet Marketing and Search Engine Optimization (SEO) Services, Consulting, and Research, Warrenton, VA, USA, May, 2009 (Blog).
Silviu Cucerzan et al., "Query Suggestion based on User Landing Pages", Annual ACM Conference on Research and Development in Information Retrieval, Proceedings of the 30th annual international ACM SIGIR conference on Research and development in information retrieval, Amsterdam, The Netherlands, Jul. 2007, pp. 875-876.

* cited by examiner

*Primary Examiner* — Jensen Hu
(74) *Attorney, Agent, or Firm* — Law Offices of Ira D. Blecker, P.C.

(57) ABSTRACT

Disclosed is a method of presenting a search suggestion to a user. The method includes receiving a portion of a search query from the user. Responsive to receiving the portion of the search query, presenting to the user one or more search suggestions and at least one social comment icon corresponding to at least one of the one or more search suggestions. The method also includes selecting the at least one social comment icon to view comments from and websites recommended by at least one friend of the user, the comments and websites pertaining to the corresponding at least one of the one or more search suggestions Also disclosed are computer program products.

21 Claims, 4 Drawing Sheets

PRESENTING A SEARCH SUGGESTION WITH A SOCIAL COMMENTS ICON

BACKGROUND

The present invention relates to presenting a search suggestion to a user and, more particularly, relates to presenting a search suggestion with a social comments icon that represents information from one or more friends of the user obtained from a social networking site.

Search engines have become useful tools in helping users find information of interest across the internet. Typically, when a user wishes to use a search engine, the user may input a search query into a search box. The user can then submit the search query, which can lead the user to a search results page of one or more search results corresponding to the query. The user may then be able to select one of the search results, in which the selection of the result may lead the user to a web page for browsing.

For a better experience in internet searching, a query suggestion is provided in response to a user's input of a search query. In this way, the user types less to get a search result.

BRIEF SUMMARY

The various advantages and purposes of the exemplary embodiments as described above and hereafter are achieved by providing, according to a first aspect of the exemplary embodiments, a method of presenting a search suggestion to a user. The method includes receiving a portion of a search query from the user; responsive to receiving the portion of the search query, displaying to the user by a computer processor one or more. search suggestions and at least one social comment icon corresponding to at least one of the one or more search suggestions.

According to a second aspect of the invention, there is provided a method of presenting a search suggestion to a user. The method includes receiving a portion of a search query from a user; responsive to receiving the portion of the search query, displaying by a computer processor to the user one or more search suggestions and at least one social comment icon corresponding to at least one of the one or more search suggestions; responsive to selecting the at least one social comment icon, displaying by a computer processor comments from and websites recommended by at least one friend of the user from a social networking server, the comments and websites pertaining to the corresponding at least one of the one or more search suggestions.

Also provided according to further aspects of the invention are computer program products for presenting a search suggestion.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

Figure 1:
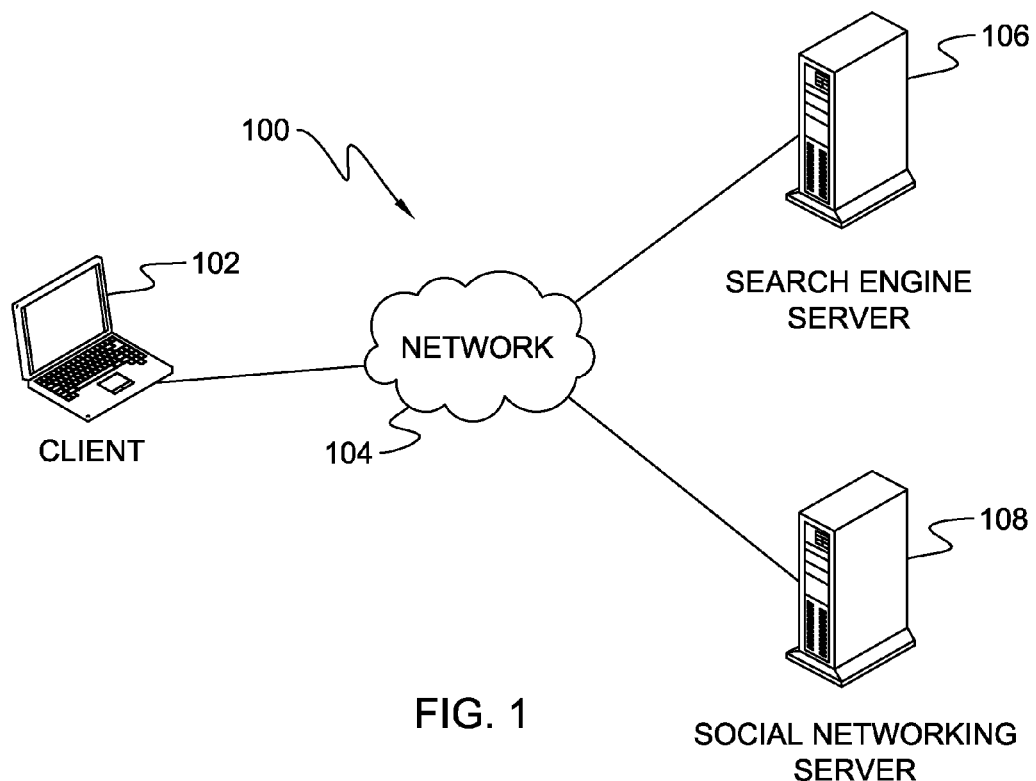
FIG. 1 is a diagram that illustrates one exemplary hardware environment of the present invention.

FIG. 1 is a block diagram of an exemplary system 100 for implementing exemplary embodiments of the invention. The system 100 may include devices such as a client 102, search engine server 106 and social networking server 108.

Figure 2:
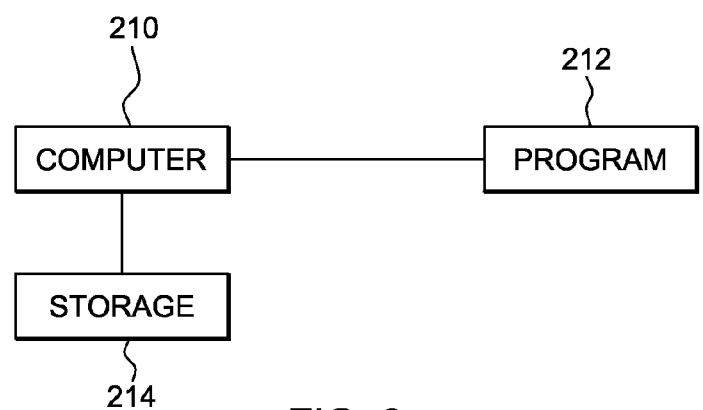
FIG. 2 is a block diagram of a device for use in practicing the exemplary hardware environment of FIG. 1.

Each of the devices 102, 106, 108 may be implemented by a general-purpose computer or a special purpose device such as a hand-held computer. FIG. 2 is a block diagram that illustrates one exemplary hardware environment of the devices 102, 106, 108. The exemplary embodiments may be implemented using a computer 210 comprised of microprocessor means, random access memory (RAM), read-only memory (ROM) and other components. The computer 210 may be a personal computer, server, mainframe computer, hand-held device or other computing device. Resident in the computer 210, or peripheral to it, will be a storage device 214 of some type such as a hard disk drive, floppy disk drive, CD-ROM drive, tape drive or other storage device.

Generally speaking, the software implementation of the exemplary embodiments, program 212 in FIG. 2, is tangibly embodied in a computer-readable medium such as one of the storage devices 214 mentioned above. The program 212 comprises instructions which, when read and executed by the microprocessor of the computer 210, cause the computer 210 to perform the steps necessary to execute the steps or elements of the exemplary embodiments.

Referring again to FIG. 1, each of the devices 102, 106, 108 may also include a communication interface (not shown) that may allow one or more of the devices 102, 106, 108 to be directly connected to any other device or may allow a device to be connected to another device over network 104. Network 104 can include, for example, a local area network (LAN), a wide area network (WAN), the internet or any other network. Network 104 can be wired or wireless.

The search engine server 106 may be configured to receive search queries, or portions of search queries, submitted by a user at client 102. The search engine server 106 may include means for providing query suggestions in response to search queries submitted by the user. The means for providing query suggestions may also include a repository of query suggestions. Search engine server 106 may have an auto-complete function which can suggest a list of most likely query suggestions in response to the currently typed-in portion of a search query by the user. These likely query suggestions may come from the repository of query suggestions stored in the search engine server 106 or some other means. Search engine server 106 is typically managed by a company such as Google, Yahoo or Microsoft.

Social networking server 108 implements a social networking site such as Facebook, Orkut, or MySpace or any other social networking site. Such social networking sites are very popular and allow communities of users to communicate with each other and share information. A user may have a profile stored in the social networking Site. The profile may contain various personal and business information pertaining to the user such as interests, dislikes, friends, contacts, pictures, business activities, etc.

In exemplary embodiments, it is proposed that when a user enters a social networking site, that social networking site is paired with a search engine. The user may log into a social networking site and perform a search. However, since the social networking site is paired with a search engine, when the user performs the search, the search will encompass the social networking site as well as other sites on the internet that the search engine may access. As an example, the Facebook social networking site may be paired with a search engine such as Google. When a user enters a search query into a search box in Facebook, query suggestions are proposed to the user by the Google search engine. These query suggestions encompass possible places of interest on the Facebook social networking site as well as the internet as a whole since the Google search engine searches not only the Facebook social networking site but also the internet as a whole.

Figure 3:
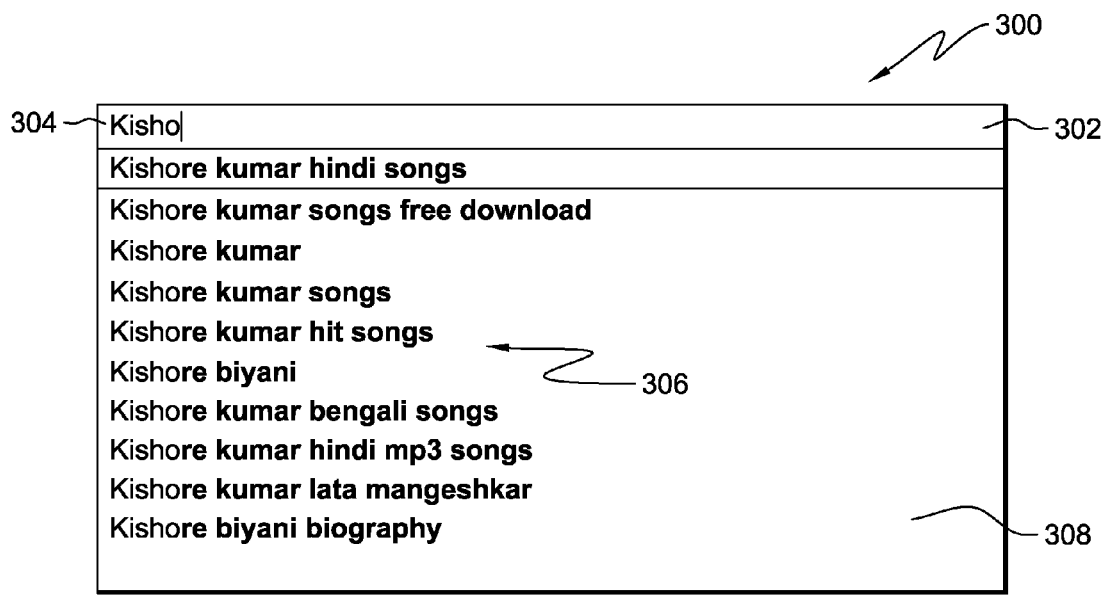
FIG. 3 is a conventional query suggestion display.

Referring now to FIG. 3, there is shown a conventional query suggestion display 300. A user begins typing a search query 304 in the search box 302. The search query 304 is communicated to a search engine server which provides query suggestions 306 in display box 308. The query suggestions 306 may be provided from a repository of query suggestions stored in the search engine server or the search engine server may search the internet in real time to come up with the query suggestions 306. In the conventional query suggestions display, the search engine server does not communicate with a social networking server so the query suggestions 306 displayed come from the internet as a whole.

Figure 4:
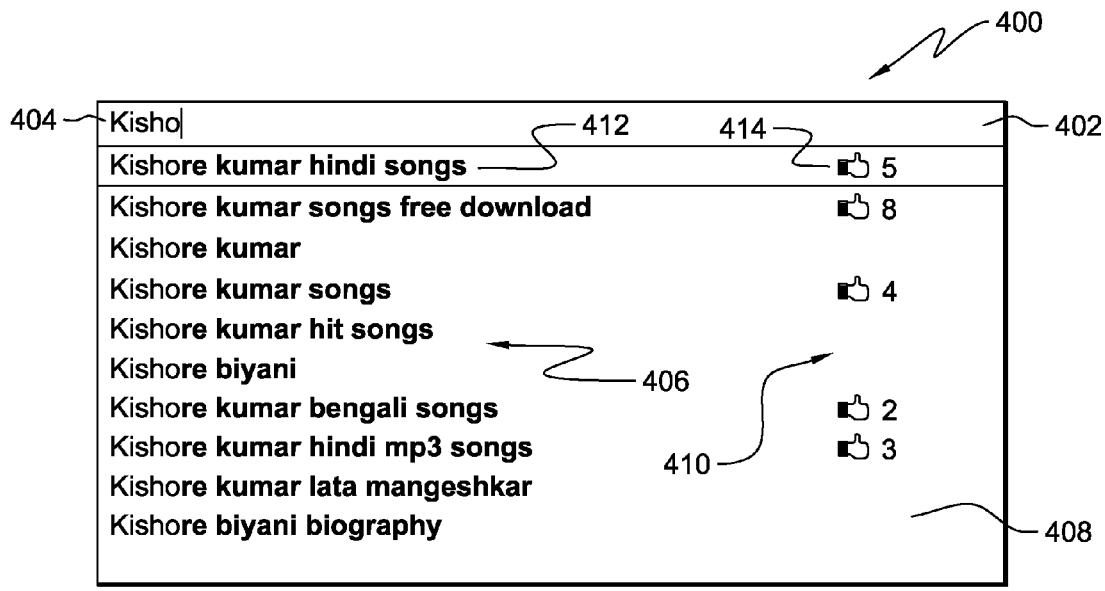
FIG. 4 is a query suggestion display for an exemplary embodiment having social comment icons.

Referring now to FIG. 4, there is shown a query suggestion display 400 according to an exemplary embodiment. A user begins typing at the client device 102 (FIG. 1) a search query 404 in the search box 402. Referring now also to FIG. 1, the search query 404 is communicated by network 104 to a search engine server 106 which provides query suggestions 406 in display box 408. The query suggestions 406 may be provided from a repository of query suggestions stored in the search engine server 106 or the search engine server 106 may search the internet in real time to come up with the query suggestions 406. In an exemplary embodiment, the search query 404 is also communicated to social networking server 108. In an exemplary embodiment, the search query 404 may be communicated to the social networking server 108 by search engine server 106. As a result of the search query 404 being sent to the social networking server 108, those query suggestions 406 that have corresponding feedback or recommendations stored in the social networking server 108 with respect to the query suggestions 406 are displayed with a corresponding social comment icon 410. Only those feedback or recommendations from the user's friends may be displayed. The social networking server 108 may use the user's profile as stored in the social networking server 108 to find and display only those feedback or recommendations from the user's "friends" as defined in the user's profile. As to be discussed in more detail hereafter, the feedback or recommendations are displayed as comments.

For example, the search query "Kisho" 404 has resulted in numerous query suggestions 406, one of which is the query suggestion "kishore kumar hindi songs" 412, and numerous social comment icons 410, one of which is social comment icon 414. The social comment icon 414 corresponds to the query suggestion 412. The form of the social comment icon is unimportant. For purposes of illustration and not limitation, the social comment icons 410 are in the form of a "thumbs up" sign. In addition, the exemplary embodiment includes a number by each social comment icon 410 indicating the number of comments pertaining to that social comment icon 410. For example, the social comment icon 414 has the number "5" indicating that there are five comments pertaining to that social comment icon 414. The method of displaying those comments will be discussed hereafter.

Icons are essentially pictograms that can represent a macro command, process, file, folder, application, device, etc. For the exemplary embodiments, the icon represents comments from the user's friends that pertain to a particular search suggestion.

Figure 5:
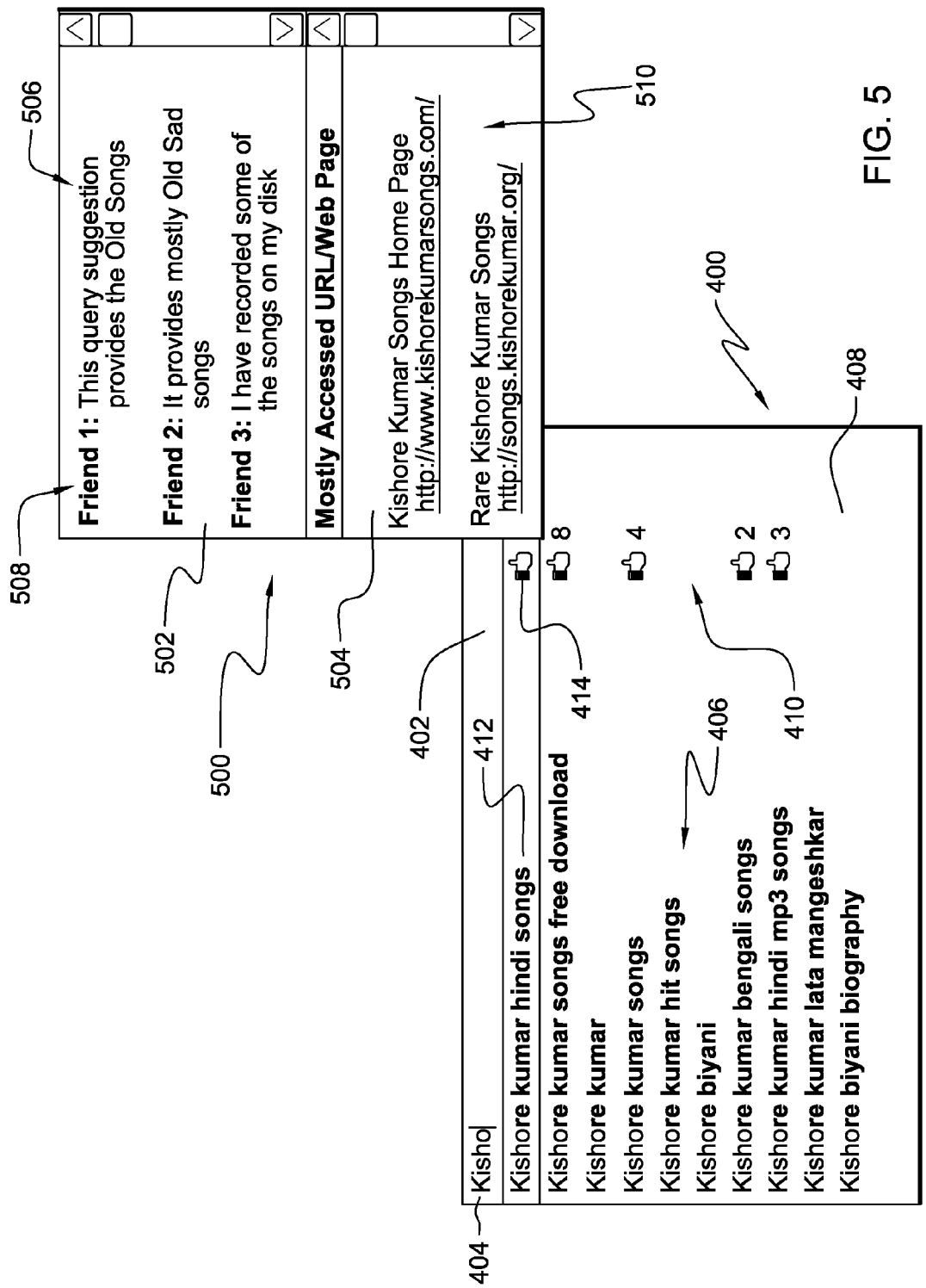
FIG. 5 is the query suggestion display of FIG. 4 with the one of the social comment icons expanded to show a pop-up box containing friends' comments and websites.

To display the comments pertaining to the social comment icons 410, any of the social comment icons 410 is selected and the comments are displayed in a new display box 500 (FIG. 5). In one exemplary embodiment, when a cursor or mouse pointer hovers over any of the social comment icons 410, a new display box 500 opens. In other exemplary embodiments, the cursor or mouse pointer may be moved over the social comment icons 410 and a button on a mouse is clicked (left or right click) or the enter key is pressed. It is unimportant to the exemplary embodiments how the social comment icons 410 are selected.

As shown in FIG. 5, social comment icon 414 has been selected and display box 500 opens as a pop-up window. In an exemplary embodiment, the display box 500 is divided into two smaller boxes 502, 504. Box 502 displays the comments 506 from the user's friends 508. Again, the user's friends are defined in the user's profile in the social networking server 108. Box 504 displays those websites 510 that have been highest ranked against the query suggestion. Ranking may be by any methodology and based on criteria such as number of hits, appropriateness, number of users accessed. A user's profile as stored in the social networking server 108 may also be used as a criteria for comments 506 from the user's friends 508 and for ranking the websites 510 provided to the user. For example, user A may have mentioned in his profile that he likes to listen to online songs and another user B may have mentioned in his profile that he likes to watch video. So, in this example, song related comments and websites may be displayed to user A while video related comments and websites may be displayed to user B. In another exemplary embodiment, only the comments box 502 may be displayed while in another exemplary embodiment, only the websites box 504 may be displayed. It is preferred, however, for both the comments box 502 and websites box 504 to be displayed simultaneously.

When the social comment icon 414 was selected, the comments 506 in comments box 502 and the websites 510 in websites box 504 are displayed in display box 500. It should he understood that the comments 506 and websites 510 displayed pertain to the query suggestion 412. Such an arrangement provides for a richer searching experience and allows the user to focus on the most relevant websites as determined by the user's friends who have performed similar search queries in the past. For the query suggestion 412, the friends' comments in comments box 502 provide comments with respect to the query suggestion and some of the comments specifically apply to the websites in websites box 504. The friends' comments in comments box 502 and the websites in websites box 504 may also be related to the user's profile as stored in the social networking server 108 as indicated above. The user, upon opening the display box 500 and reading the comments in comments box 502 and viewing the websites displayed in websites box 504, still has the option to ignore the comments in comments box 502 and websites in websites box 504 and select the query suggestion 412 for searching on the internet as a whole by the search engine server 106.

Figure 6:
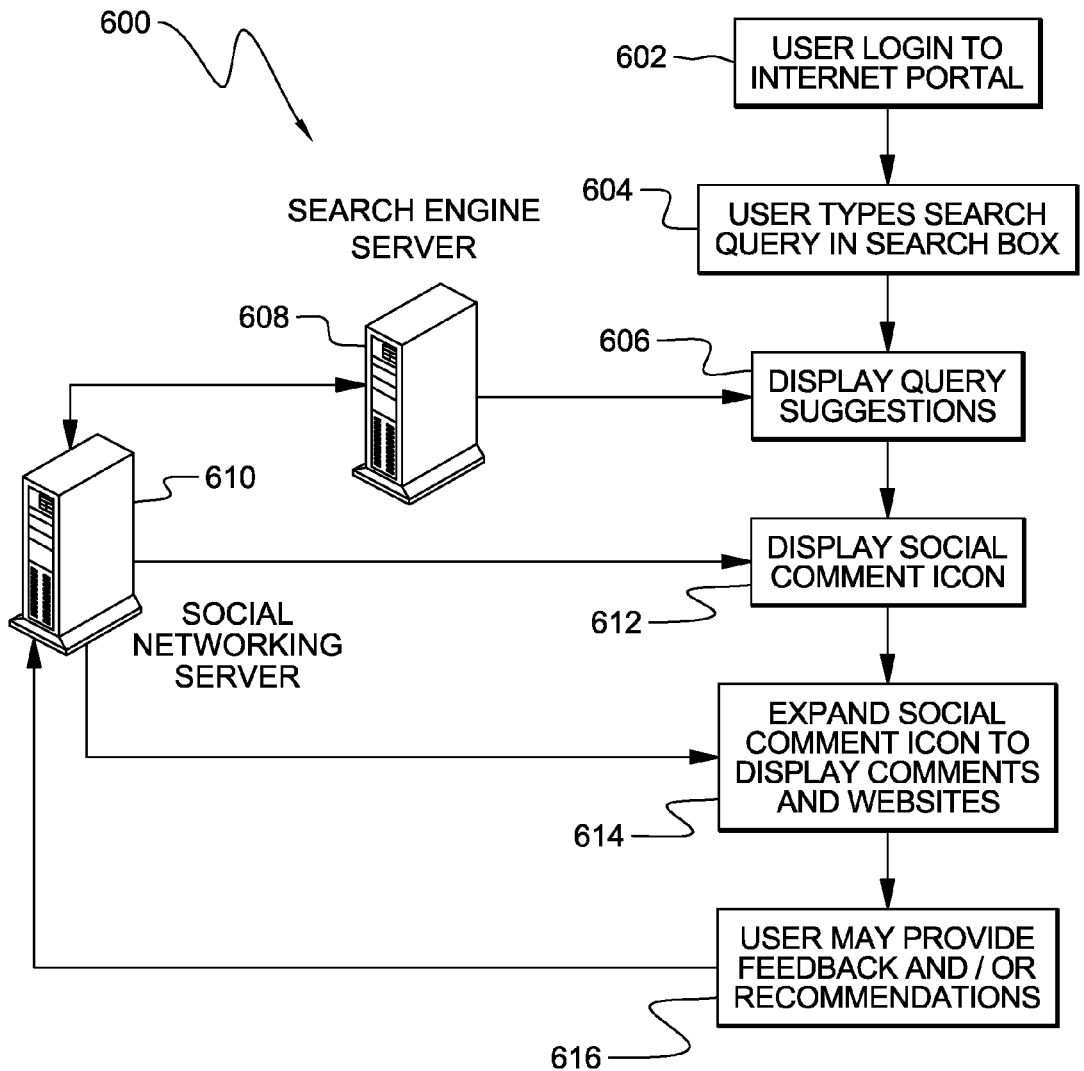
FIG. 6 is a flow chart illustrating the methodology of the exemplary embodiments.

The methodology 600 of the exemplary embodiments is set forth in more detail in FIG. 6. The user logs in to the internet search portal, box 602. The internet search portal may be configured in a number of ways. In an exemplary embodiment, the internet search portal is a search engine server (for example, the Google search engine server) which has been configured by the user to additionally search a social networking server (for example, the Facebook server) whenever internet searches are conducted. The configuration of the search engine server may be by, for example, using the settings of the search engine server. In another exemplary embodiment, the internet search portal may be the social network website which is linked with a search engine (for example, Orkut social networking website and Google search engine) so that searches may be conducted just on the social network website by the search engine through the social networking server or on both the social network website and the internet as a whole. Other ways may come to one skilled in the art. What is significant is to have a search engine server paired with a social networking server so that search queries may be conducted on the social networking server as well as the internet as a whole. In an exemplary embodiment, the search engine server and social networking server may be combined into a single server performing both a search engine function and a social networking function.

The user starts typing the search query in the search box of the search engine display as indicated in box 604. Thereafter, query suggestions (such as query suggestions 406 in FIG. 4) are displayed, box 606, based on the characters inputted in box 604. The characters inputted in box 604 may amount to only a partial search query as shown in FIG. 4. The query suggestions may come from the search engine server 608.

The query suggestions from search engine server 608 are communicated to the social networking server 610. The social networking server 610 is searched for feedback and recommendations from friends of the user against the query suggestions. The user's profile as stored in the social networking server 610 may be useful for determining the user's friends and interest and for searching for feedback and recommendations from friends of the user against the query suggestions. These feedback and recommendations have been previously stored in the social networking server 610 based on past search queries and searches. If there are any feedback and recommendations for a query suggestion, there will be a social comment icon displayed corresponding to the query suggestion, box 612. If there is a single server providing both a search engine function and a social networking function, the query suggestions and feedback and recommendations from friends of the user may be identified and provided by the single server.

When the user brings his cursor or mouse pointer over the social comment icon to select the social comment icon, then the list of comments (i.e., feedback and recommendations) and websites will be displayed in a pop-up window against the query suggestion, box 614. The user may then read the comments and possibly choose one of the displayed websites to visit. If the user clicks on the recommend URL in box 504, the webpage will be opened. Alternatively, the user may click on the corresponding query suggestion (or any other query suggestion) and search the internet as a whole for websites of interest.

Lastly, feedback and recommendations may be provided to the social networking server 610 as indicated by box 616. The feedback and recommendations may occur by the user submitting such information when prompted to. For example, when the user visits a website in the list of websites presented in the pop-up window discussed above in connection with box 614, the user may be presented with a prompt to provide feedback or recommendations for the website. In an exemplary embodiment, each website visited from the query suggestion or from the list of websites presented in the pop-up box discussed above in connection with box 614 may be recorded automatically by the social networking server 610 and possibly also the search engine server 608 which enables the building of a "most accessed" list of websites.

As will be appreciated by one skilled in the art, aspects of the exemplary embodiments may be embodied as a system, method, service method or computer program product. Accordingly, aspects of the exemplary embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the exemplary embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the exemplary embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the exemplary embodiments have been described above with reference to flowchart illustrations and/or block diagrams of methods, apparatus (systems) and computer program products according to the exemplary embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the Figures illustrate the architecture, functionality, and operation of possible implementations of systems, methods, service methods and computer program products according to the exemplary embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method of presenting a search suggestion to a user comprising:
   receiving by a search engine server a portion of a search query from the user, the search engine server having the capability to search the internet as a whole;
   responsive to receiving the portion of the search query, displaying to the user by the search engine server a plurality of search query suggestions and searching a social networking site by a social networking server for feedback and recommendations from at least one friend of the user with respect to the plurality of search query suggestions and displaying to the user by the social networking server a plurality of interactive social comment icons corresponding to at least some of the plurality of search query suggestions such that each social comment icon is displayed with the corresponding one of the search query suggestions, the social networking server being limited to only searching the social networking site.

2. The method of claim 1 wherein each of the interactive social comment icons represents information from at least one friend of the user obtained from a social networking server.

3. The method of claim 1 further comprising responsive to selecting one interactive social comment icon, displaying by a computer processor comments from at least one friend of tile user, the comments obtained from a social networking server and pertaining to the corresponding search query suggestion.

4. The method of claim 1 further comprising responsive to selecting one interactive social comment icon, displaying by a computer processor websites recommended by at least one friend of the user, the websites obtained from a social networking server and pertaining to the corresponding search query suggestion.

5. The method of claim 1 further comprising responsive to selecting one interactive social comment icon, displaying to the user by the social networking server comments from and websites recommended by at least one friend of the user, the comments and websites obtained from the social networking server and pertaining to the corresponding search query suggestion.

6. The method of claim 3 wherein the comments are from a plurality of friends and are presented as a list with a correspondence between each comment and a friend.

7. The method of claim 5 wherein the user has a profile at a social networking website served by the social networking server and the comments and websites also pertain to the user's profile.

8. The method of claim 2 wherein the interactive social comment icons include a number to indicate the number of friends from which information has been obtained from the social networking server.

9. The method of claim 5 wherein the interactive social comment icons include a number to indicate the number of friends providing comments or recommending websites.

10. A method of and computer program product for presenting a search suggestion to a user comprising:
    receiving by a search engine server a portion of a search query from the user, the search engine server having the capability to search the internet as a whole;
    responsive to receiving the portion of the search query, displaying by the search engine server to the user a plurality of search query suggestions and searching a social networking site by a social networking server for feedback and recommendations from at least one friend of the user with respect to the plurality of search query suggestions and displaying to the user by the social networking server a plurality of interactive social comment icons corresponding to at least some of the plurality of search query suggestions such that each social comment icon is displayed with the corresponding one of the search query suggestions, the social networking server being limited to only searching the social networking site;

responsive to selecting one interactive social comment icon, displaying to the user by the social networking server comments from and websites recommended by at least one friend of the user from the social networking server, the comments and websites pertaining to the corresponding search query suggestion.

11. The method of claim 10 wherein the user has a profile at a social networking website served by the social networking server and the comments and websites also pertain to the user's profile.

12. The method of claim 10 wherein each of the interactive social comment icons includes a number to indicate the number of friends providing comments or recommending websites.

13. A computer program product for presenting a search suggestion, the computer program product comprising:
a computer readable storage medium having computer readable program code embodied therewith, the computer readable program code comprising:
computer readable program code configured to receive by a search engine server a portion of a search query from the user, the search engine server having the capability to search the internet as a whole;
responsive to receiving the portion of the search query, computer readable program code configured to display by the search engine server to a user a plurality of search query suggestions and search a social networking site by a social networking server for feedback and recommendations from at least one friend of the user with respect to the plurality of search query suggestions and to display to the user by the social networking server a plurality of interactive social comment icons corresponding to at least some of the plurality of search query suggestions such that each social comment icon is displayed with the corresponding search query suggestion, the social networking server being limited to only searching the social networking site.

14. The computer program product of claim 13 wherein each of the interactive social comment icons represents information from at least one friend of the user obtained from the social networking server.

15. The computer program product of claim 13 wherein responsive to selecting one interactive social comment icon, further comprising computer readable program code configured to display to the user by the social networking server comments from and websites recommended by at least one friend of the user from the social networking server, the comments and websites pertaining to the corresponding search query suggestion.

16. The computer program product of claim 15 wherein the comments are from a plurality of friends and are presented as a list with a correspondence between each comment and a friend.

17. The computer program product of claim 16 wherein each of the interactive social comment icons includes a number to indicate the number of friends providing comments or recommending websites.

18. A computer program product for presenting a search suggestion, the computer program product comprising:
a computer readable storage medium having computer readable program code embodied therewith, the computer readable program code comprising:
computer readable program code configured to receive by a search engine server a portion of a search query, the search engine server having the capability to search the internet as a whole;
responsive to receiving the portion of the search query, computer readable program code configured to display by the search engine server to a user a plurality of search query suggestions and to search a social networking site by a social networking server for feedback and recommendations from at least one friend of the user with respect to the plurality of search query suggestions and to display to the user by the social networking server a plurality of interactive social comment icons corresponding to at least some of the plurality of search query suggestions such that each social comment icon is displayed with the corresponding one of the search query suggestions, the social networking server being limited to only to search the social networking site;
responsive to selecting one interactive social comment icon, computer readable program code configured to display to the user by the social networking server comments from and websites recommended by at least one friend of the user from the social networking server, the comments and websites pertaining to the corresponding search query suggestion.

19. The computer program product of claim 18 wherein the comments are from a plurality of friends and are presented as a list with a correspondence between each comment and a friend.

20. The computer program product of claim 18 wherein each of the interactive social comment icons includes a number to indicate the number of friends providing comments or recommending websites.

21. The method of claim 1 wherein the plurality of search query suggestions and the plurality of interactive social comment icons are displayed to the user in the same display window, further comprising responsive to selecting one interactive social comment icon, displaying to the user by the social networking server in a pop-up window within the display window comments from at least one friend of the user or websites recommended by at least one friend of the user, the comments or websites obtained from the social networking server and pertaining to the corresponding search query suggestion.

* * * * *